(12) United States Patent
Basur Shankarappa et al.

(10) Patent No.: US 10,579,488 B2
(45) Date of Patent: Mar. 3, 2020

(54) AUTO-CALCULATION OF RECOVERY PLANS FOR DISASTER RECOVERY SOLUTIONS

(71) Applicant: VMWARE, INC., Palo Alto, CA (US)

(72) Inventors: Narendra Kumar Basur Shankarappa, Palo Alto, CA (US); Serge Maskalik, Palo Alto, CA (US); Uday Masurekar, Palo Alto, CA (US); Anand Pritam, Bangalore (IN); Aravind Srinivasan, Palo Alto, CA (US); Bob Sheehan, Palo Alto, CA (US); Abhijeet Deshpande, Palo Alto, CA (US); Sachin Thakkar, Palo Alto, CA (US); Hemanth Kumar Pannem, Palo Alto, CA (US)

(73) Assignee: VMare, Inc., Palo Alto, CA (US)

( * ) Notice: Subject to any disclaimer, the term of this patent is extended or adjusted under 35 U.S.C. 154(b) by 187 days.

(21) Appl. No.: 15/713,714

(22) Filed: Sep. 25, 2017

(65) Prior Publication Data

US 2019/0034297 A1    Jan. 31, 2019

(30) Foreign Application Priority Data

Jul. 31, 2017    (IN) .............................. 201741027187

(51) Int. Cl.
| | | |
|---|---|---|
| *G06F 11/00* | (2006.01) | |
| *G06F 11/20* | (2006.01) | |
| *G06F 9/48* | (2006.01) | |
| *G06F 11/14* | (2006.01) | |
| *G06F 9/455* | (2018.01) | |
| *G06F 3/06* | (2006.01) | |
| *G06F 9/50* | (2006.01) | |

(52) U.S. Cl.
CPC .......... *G06F 11/203* (2013.01); *G06F 3/0647* (2013.01); *G06F 9/45558* (2013.01); *G06F 9/4856* (2013.01); *G06F 9/5077* (2013.01); *G06F 11/1469* (2013.01); *G06F 11/1471* (2013.01); *G06F 2009/4557* (2013.01)

(58) Field of Classification Search
CPC ................................................. G06F 11/203
USPC ........................................................ 714/4.11
See application file for complete search history.

(56) References Cited

U.S. PATENT DOCUMENTS

| | | | | |
|---|---|---|---|---|
| 2009/0282266 A1* | 11/2009 | Fries | ..................... | G06F 21/602 713/193 |
| 2012/0180044 A1* | 7/2012 | Donnellan | .......... | H04L 61/2007 718/1 |

(Continued)

*Primary Examiner* — Chae M Ko
(74) *Attorney, Agent, or Firm* — Patterson + Sheridan, LLP

(57) ABSTRACT

One or more embodiments provide techniques for migrating virtual machines (VMs) from a private data center to a cloud data center. A hybrid cloud manager determines a scope of migration from the private data center to the cloud data center. The hybrid cloud manager groups each VM included in the scope of migration into one or more clusters. The hybrid cloud manager defines one or more migration phases. Each migration phase comprises a subset of the one or more clusters. The hybrid cloud manager generates a migration schedule based on at least the one or more migration phases. The hybrid cloud manager migrates the VMs from the private data center to the cloud data center in accordance with the migration schedule.

20 Claims, 8 Drawing Sheets

(56) References Cited

U.S. PATENT DOCUMENTS

| | | | |
|---|---|---|---|
| 2013/0191527 A1* | 7/2013 | Ashok | H04L 67/1031 709/224 |
| 2013/0283364 A1* | 10/2013 | Chang | H04L 49/70 726/12 |
| 2014/0033188 A1* | 1/2014 | Beavers | G06F 8/65 717/170 |
| 2014/0137244 A1* | 5/2014 | Banerjee | G06F 21/52 726/22 |
| 2014/0222953 A1* | 8/2014 | Karve | G06F 9/455 709/217 |
| 2015/0052524 A1* | 2/2015 | Raghu | G06F 9/455 718/1 |
| 2015/0142786 A1* | 5/2015 | Dawson | H04L 41/5003 707/723 |
| 2015/0172331 A1* | 6/2015 | Raman | H04L 65/403 709/204 |
| 2015/0234670 A1* | 8/2015 | Shimogawa | G06F 9/45533 718/1 |
| 2015/0263894 A1* | 9/2015 | Kasturi | H04L 41/0806 709/222 |
| 2015/0295792 A1* | 10/2015 | Cropper | H04L 41/5022 709/226 |
| 2015/0370594 A1* | 12/2015 | Ghosh | G06F 9/45533 718/1 |
| 2015/0382242 A1* | 12/2015 | Sunavala | H04W 24/02 370/254 |
| 2016/0055023 A1* | 2/2016 | Ghosh | G06F 9/45558 718/1 |
| 2016/0105321 A1* | 4/2016 | Thakkar | H04L 41/0853 709/220 |
| 2016/0188353 A1* | 6/2016 | Shu | G06F 9/45533 718/1 |
| 2016/0378520 A1* | 12/2016 | Dow | G06F 9/45558 718/1 |
| 2016/0378524 A1* | 12/2016 | Gough | G06F 9/45558 718/1 |
| 2016/0380840 A1* | 12/2016 | Karve | H04L 67/1097 709/223 |
| 2017/0026355 A1* | 1/2017 | Mathaiyan | H04L 63/08 |
| 2017/0031710 A1* | 2/2017 | Kuik | G06F 9/4856 |
| 2017/0054606 A1* | 2/2017 | Cropper | G06F 9/45558 |
| 2017/0085488 A1* | 3/2017 | Bhattacharya | H04L 41/0813 |
| 2017/0118173 A1* | 4/2017 | Arramreddy | H04L 63/0236 |
| 2017/0139742 A1* | 5/2017 | Cropper | G06F 9/4856 |
| 2017/0171157 A1* | 6/2017 | Hristov | H04L 63/0272 |
| 2017/0206701 A1* | 7/2017 | Agrawal | H04L 41/22 |
| 2017/0251064 A1* | 8/2017 | Xie | H04L 67/148 |
| 2017/0366606 A1* | 12/2017 | Ben-Shaul | H04L 67/1097 |
| 2018/0034821 A1* | 2/2018 | Basetty | G06F 9/45558 |

\* cited by examiner

| Appliance Name | Group | Phase | Retain boot order | SSD | DR | DPS |
|---|---|---|---|---|---|---|
| VM₁ | Group₁ | Phase 1 | Yes | Yes | Yes | Yes |
| VM₂ | Group₁ | Phase 1 | Yes | No | Yes | Yes |
| VM₃ | Group₂ | Phase 1 | Yes | Yes | No | No |
| VM₄ | Group₅ | Phase 3 | Yes | Yes | No | No |
| ... | | | | | | ... |

490

| Group | Time est. | Transfer Size Es. | Retry policy | Alert level | Migration type | ... |
|---|---|---|---|---|---|---|
| Group_name1 | 10-45 min. | 950G | Rollback | High | Hot | |
| Group_name1 | 5 hr. | 500G | 3 | High | Hot | |

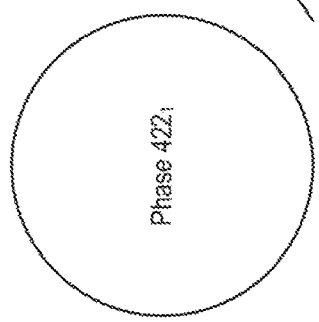

| Group | Time est. | Transfer Size Est. | Retry policy | Alert level | Migration type | ... |
|---|---|---|---|---|---|---|
| Group_name1 | 25-30 min. | 5500G | Rollback | Medium | Warm | |
| Group_name2 | 2 hr. | 300G | None | High | Hot | |

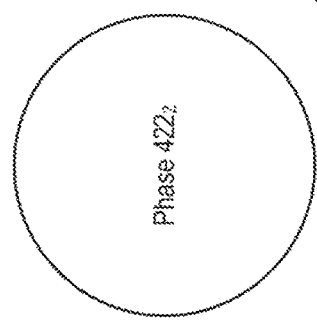

| Group | Time est. | Transfer Size Est. | Retry policy | Alert level | Migration type | ... |
|---|---|---|---|---|---|---|
| Group_name3 | 30-50 min. | 3250G | Rollback | High | Hot | |
| Group_name3 | 3 hr. | 500G | 1 | Low | Cold | |

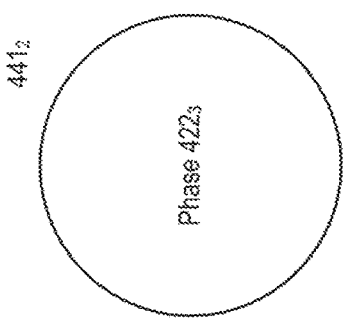

FIG. 4E

AUTO-CALCULATION OF RECOVERY PLANS FOR DISASTER RECOVERY SOLUTIONS

RELATED APPLICATION

Benefit is claimed under 35 U.S.C. 119(a)-(d) to Foreign Application Serial No. 201741027187 filed in India entitled "AUTO-CALCULATION OF RECOVERY PLANS FOR DISASTER RECOVERY SOLUTIONS", filed on Jul. 31, 2017 by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "private data centers"). The public cloud can include a multi-tenant cloud architecture providing IaaS cloud services.

SUMMARY

One or more embodiments provide techniques for migrating virtual machines (VMs) from a private data center to a cloud data center. A hybrid cloud manager determines a scope of migration from the private data center to the cloud data center. The hybrid cloud manager groups each VM included in the scope of migration into one or more clusters. The hybrid cloud manager defines one or more migration phases. Each migration phase comprises a subset of the one or more clusters. The hybrid cloud manager generates a migration schedule based on at least the one or more migration phases. The hybrid cloud manager migrates the VMs from the private data center to the cloud data center in accordance with the migration schedule.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 4E illustrates an example of a migration schedule generated by hybrid cloud manager, according to an embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
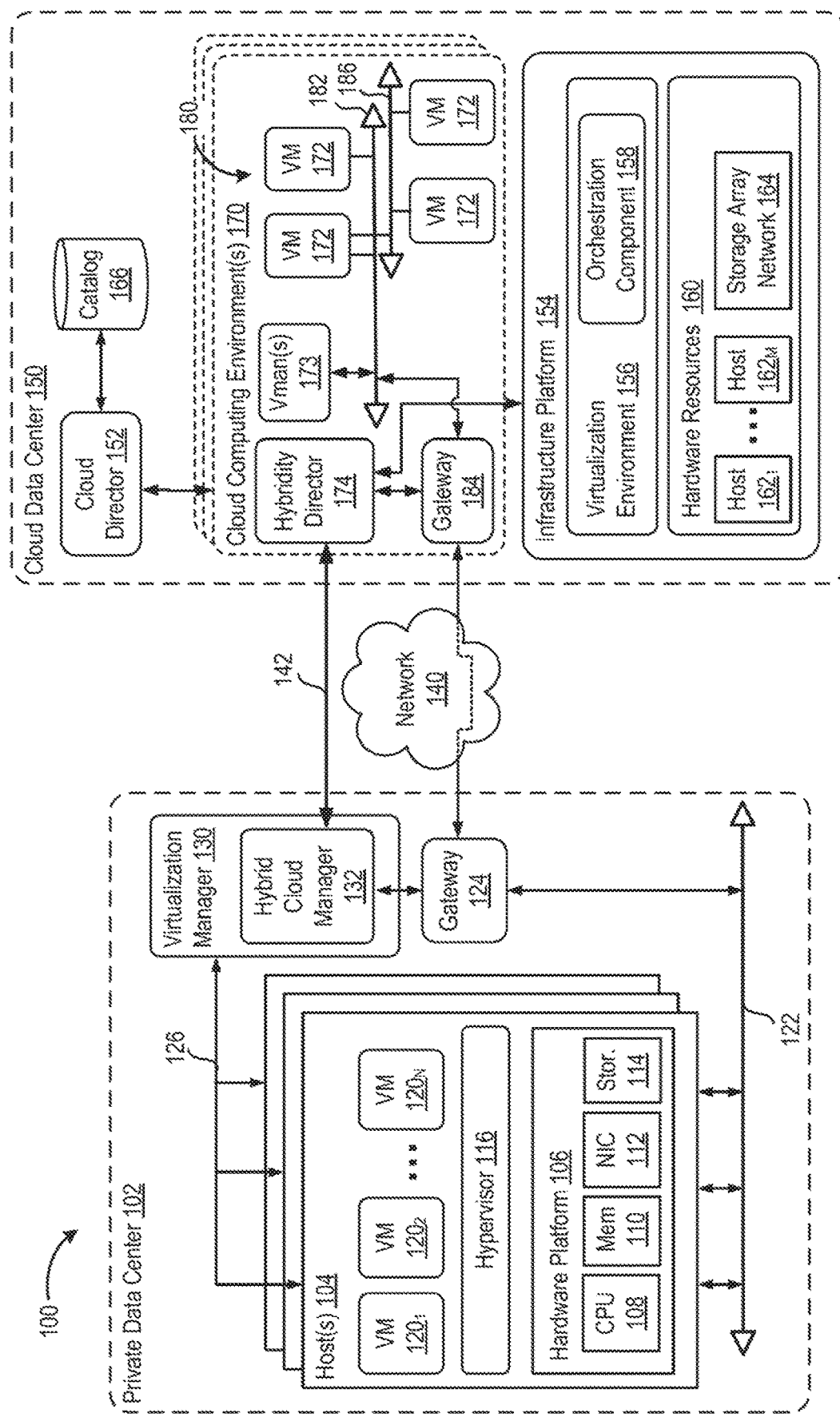
FIG. 1 is a block diagram of a hybrid cloud computing system, according to one embodiment disclosed herein.

FIG. 1 is a block diagram of a hybrid cloud computing system 100 in which one or more embodiments of the present disclosure may be utilized. Hybrid cloud computing system 100 includes a virtualized computing system implementing a private data center 102 and a virtualized computing system implementing a cloud data center 150. Hybrid cloud computing system 100 is configured to provide a common platform for managing and executing virtual workloads seamlessly between private data center 102 and cloud data center 150. In one embodiment, private data center 102 may be a data center controlled and administrated by a particular enterprise or business organization, while cloud data center 150 may be operated by a cloud computing service provider and exposed as a service available to account holders, such as the particular enterprise in addition to other enterprises. As such, private data center 102 may sometimes be referred to as a "private" cloud, and cloud data center 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Private data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within private data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

Private data center 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in private data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud data center 150 with virtualized computing resources of computing system 102 to form a unified "hybrid" computing platform. Hybrid cloud manager 132 is configured to deploy VMs in cloud data center 150, transfer VMs from virtualized computing system 102 to cloud data center 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in private data center 102 with connectivity to an external network 140 (e.g., Internet). Gateway 124 may manage external public IP addresses for VMs 120 and route traffic incoming to and outgoing from private data center 102 and provide networking services, such as firewalls, network address translation (NAT), dynamic host configuration protocol (DHCP), load balancing, and virtual private network (VPN) connectivity over a network 140.

In one or more embodiments, cloud data center 150 is configured to dynamically provide an enterprise (or users of an enterprise) with one or more virtual data centers 170 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud data center 150 may in fact be distributed across multiple data centers in different locations.

Each cloud computing environment 170 is associated with a particular tenant of cloud data center 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud data center 150). In other embodiments, cloud computing environment 170 may be configured as part of a multi-tenant cloud service with logically isolated virtualized computing resources on a shared physical infrastructure. As shown in FIG. 1, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to private data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within private data center 102. In other embodiments, gateway 184 may be configured to connect to communicate with private data center 102 using a high-throughput, dedicated link (depicted as a direct connect 142) between private data center 102 and cloud data center 150. In one or more embodiments, gateways 124 and 184 are configured to provide a "stretched" layer-2 (L2) network that spans private data center 102 and virtual data center 180, as shown in FIG. 1.

While FIG. 1 depicts a single connection between private gateway 124 and cloud-side gateway 184 for illustration purposes, it should be recognized that multiple connections between multiple private gateways 124 and cloud-side gateways 184 may be used. Furthermore, while FIG. 1 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150.

In one embodiment, each virtual data center 180 includes a "hybridity" director module (depicted as hybridity director 174) configured to communicate with the corresponding hybrid cloud manager 132 in private data center 102 to enable a common virtualized computing platform between private data center 102 and cloud data center 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud data center 150 via infrastructure platform 154.

Hybrid cloud computing system provides a software stack, which allows from the migration of VMs from any on-premise data center (e.g., private data center 102) to any cloud data center (e.g., cloud data center 150). It still remains a daunting task, however, to migrate a large portion, or the whole data center, from on-premise data center to cloud data center.

One technique for migration and disaster recovery requires users to explicitly create migration plans wherein the user must define multiple sets of VMs to be brought up, as well as the priority order inside the set of VMs. In most cases, the priority is decided by application dependence. Such a migration and recovery technique is manual, in which the user needs to define and configure based on the scenario being presented (i.e., whether disaster recovery, complete migration, partial migration, and the like).

The method discussed below automates migration and disaster recovery by generating a recommendation of a migration schedule for the VMs to be migrated from private data center 102 to cloud data center 150. The method may be applied to disaster recovery scenarios, as well as total and partial migrations.

Figure 2:
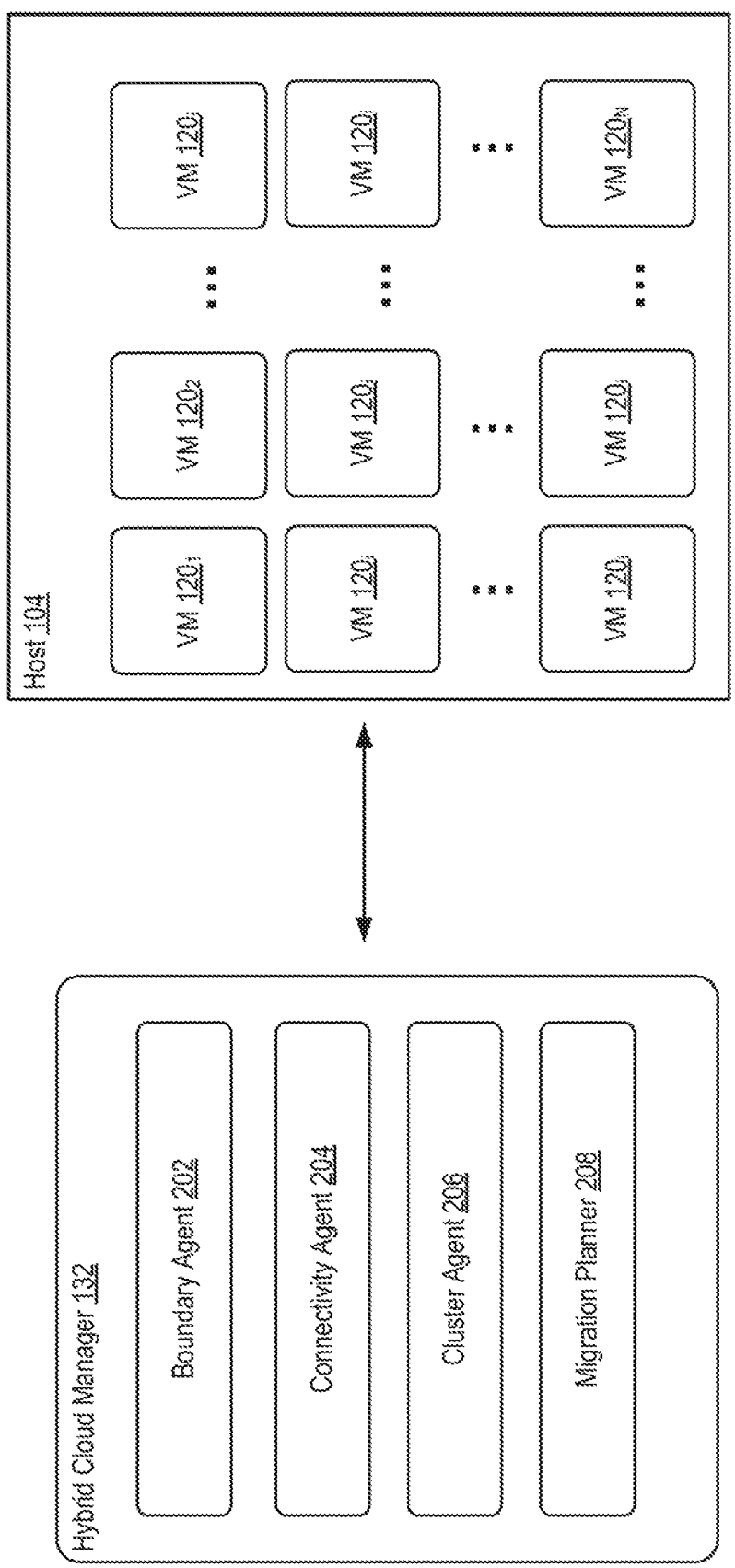
FIG. 2 is a logical diagram of the hybrid cloud computing system of FIG. 1, according to one embodiment disclosed herein.

FIG. 2 is a logical diagram of private data center 102, according to an embodiment. As recited above, private data center 102 includes a hybrid cloud manager 132 communicating with one or more VMs 120, running on host 104.

Hybrid cloud manager 102 includes a boundary agent 202, a connectivity agent 204, a cluster agent 206, and a migration planner 208.

Boundary agent 202 is configured to define a scope of migration. Determining the scope of migration aids in obtaining an accurate account of the resources, which are to be moved, as well as any external dependencies (i.e., those VMs that are not migrating) of the resources post-migration. Additionally, to enable migration and ensure dependency tracking, boundary agent 202 may also replicate private data center 102 framework in cloud data center 150. For example, boundary agent 202 prepares a landing zone in cloud data center 150 that is configured to accept new migrating workloads from private data center 102.

Connectivity agent 204 is configured to discover workloads running on private data center 102, as well as their network connectivity. For example, for each workload running on private data center 102, connectivity agent 204 will fetch resource usage metrics associated with each VM 120. In another example, connectivity agent 204 searches for signatures associated with each VM 120 to discover workloads running thereon. Based on at least the usage metrics, the signatures associated with each VM 120, and network connectivity among VMs 120, connectivity agent 204 may generate a weighted graph of VMs 120. In the graph, each VM 120 may be represented as a node. Each edge between a pair of nodes can denote network connectivity therebetween. The weighted graph aids in depicting network topology among the plurality of VMs 120. Alternatively, in another embodiment, connectivity agent 204 may be configured to receive a network topology from a user. For example, connectivity agent 204 may work with a third party plugin to allow a user to input a pre-defined topology.

Cluster agent 206 is configured to group VMs $120_n$ into one or more clusters. Cluster agent 206 may implement a variety of techniques to group VMs $120_n$. In an embodiment, cluster agent 206 parses through a profile associated with each VM $120_i$. For example, cluster agent 206 may parse through a VM profile searching for application signatures, type of operating system, and the like, to help identify like VMs $120_i$. In an embodiment, cluster agent 206 may identify groups of VMs $120_i$ by determining connectivity between VMs. For example, cluster agent 206 may identify clusters of VMs by identifying "chatty" VMs, i.e. those VMs that communicate frequently. In an embodiment, cluster agent 206 may group VMs $120_i$ into one or more clusters by determining location of each VM $120_i$. For example, generally, VMs 120, located as peers in a network provides a good indication of having some form of dependency, for having to be co-located with each other. In an embodiment, cluster agent 206 may group VMs $120_i$ into one or more clusters by identifying firewall rules or routes for each VM $120_i$. For example, generally, network security and flow rules are defined with VM groups in mind. Thus, parsing firewall data can help identify groups of VMs, which should be grouped together with minimal hurdles in between. In an embodiment, cluster agent 206 may also be able to receive input from an end user to help identify groups of VMs $120_i$.

Migration planner 208 is configured to develop a migration strategy for moving the clusters for VMs from private data center 102 to cloud data center 150. For example, migration planner 208 may develop a migration strategy based on at least the cluster's business criticality as well a given cluster's dependency to other clusters. In an embodiment, migration planner 208 may present the migration strategy to the user for approval. In an embodiment, a user may be able to edit the migration strategy generated by the migration planner 208 to expedite migration of one or more critical workloads.

Figure 3:
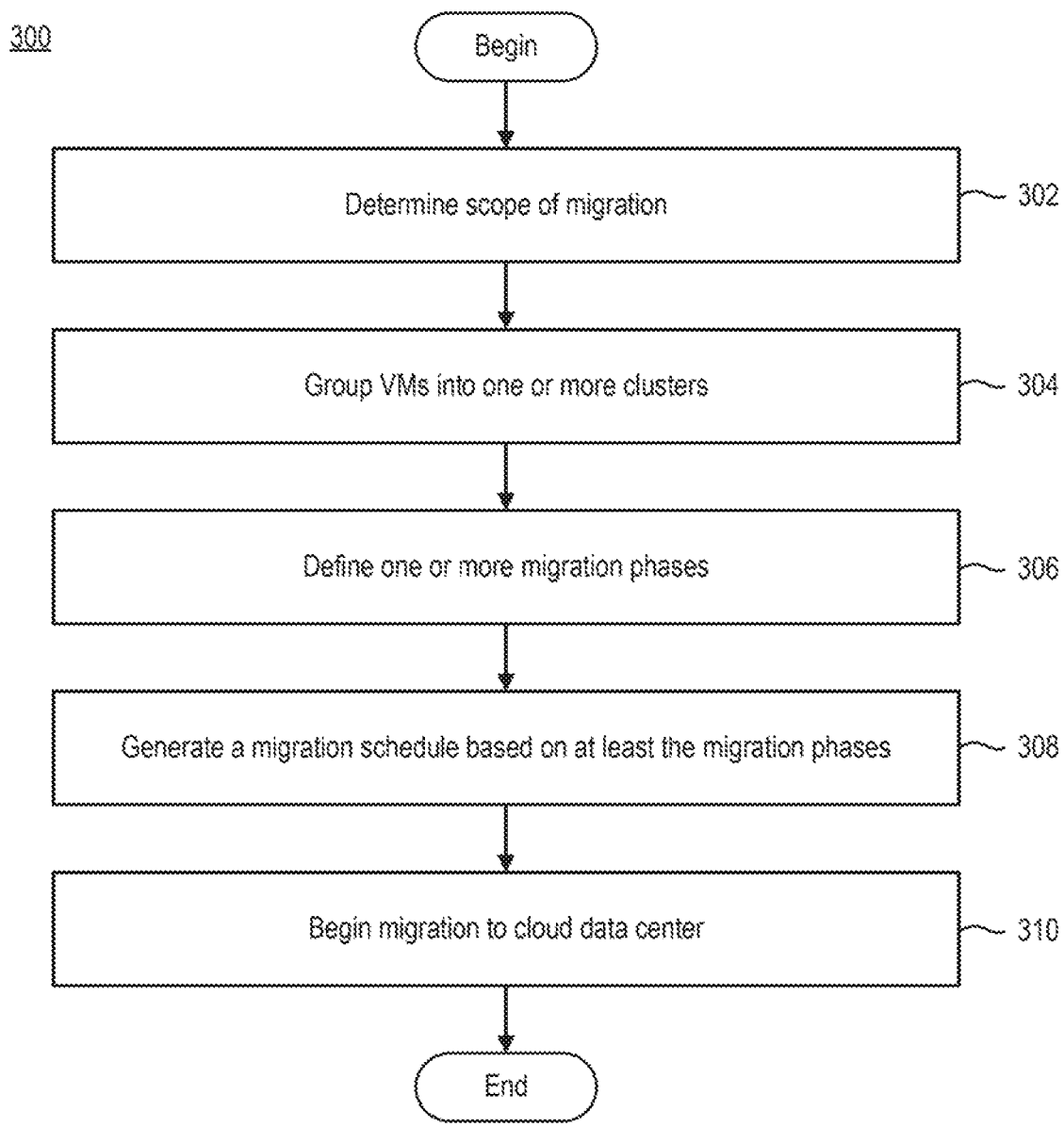
FIG. 3 is a flow diagram illustrating a method of migrating virtual machines from a private data center to a cloud data center, according to an embodiment.

FIG. 3 is a flow diagram illustrating a method 300 of migrating VMs from an on-premise data center (e.g., private data center 102) to a cloud data center (e.g., cloud data center 150), according to an embodiment. At step 302, hybrid cloud manager 132 determines a scope of migration from private data center 102 to cloud data center 150. For example, in an embodiment, a user may request a complete migration from private data center 102 to cloud data center 150. In this scenario, the scope of migration may be defined as the entirety of the client's resources on private data center 102. In another embodiment, the migration may be prompted as a result of a disaster recovery scenario. In this scenario, migration assistant 132 may define the scope of migration as only those resources that are marked as "protected," i.e. those resources that a user has chosen to protect in such a scenario. In another embodiment, a user may request that only specific resources may be migrated from private data center 102 to cloud data center 150. As such, hybrid cloud manager determines that the scope of the migration includes only the specific resources requested by the user. Defining a scope of the migration prior to migrating the resources provides an account of the resources to be moved as well as their external dependencies that will be preserved post-migration. Additionally, while defining scope of migration, hybrid cloud manager 132 may also replicate the infrastructure framework of private data center 102 onto cloud data center 150. Replicating the infrastructure framework provides a "landing zone" on cloud data center 150 that is prepared to accept new migrating workloads.

Determining the scope of migration includes discovering the workloads running on private data center 102 along with the network connectivity of those workloads. For example, hybrid cloud manager 132 may communicate with private data center 102 to determine those VMs running thereon. Once hybrid cloud manager 132 determines the VMs running on private data center 102, hybrid cloud manager 132 may fetch resource usage metrics associated with each VM, as well as information directed to applications running on each VM, identifying known application signatures. With this data, hybrid cloud manager 132 may derive a graph of VMs as nodes, with an edge between each node denoting network connectivity.

Figure 4A:
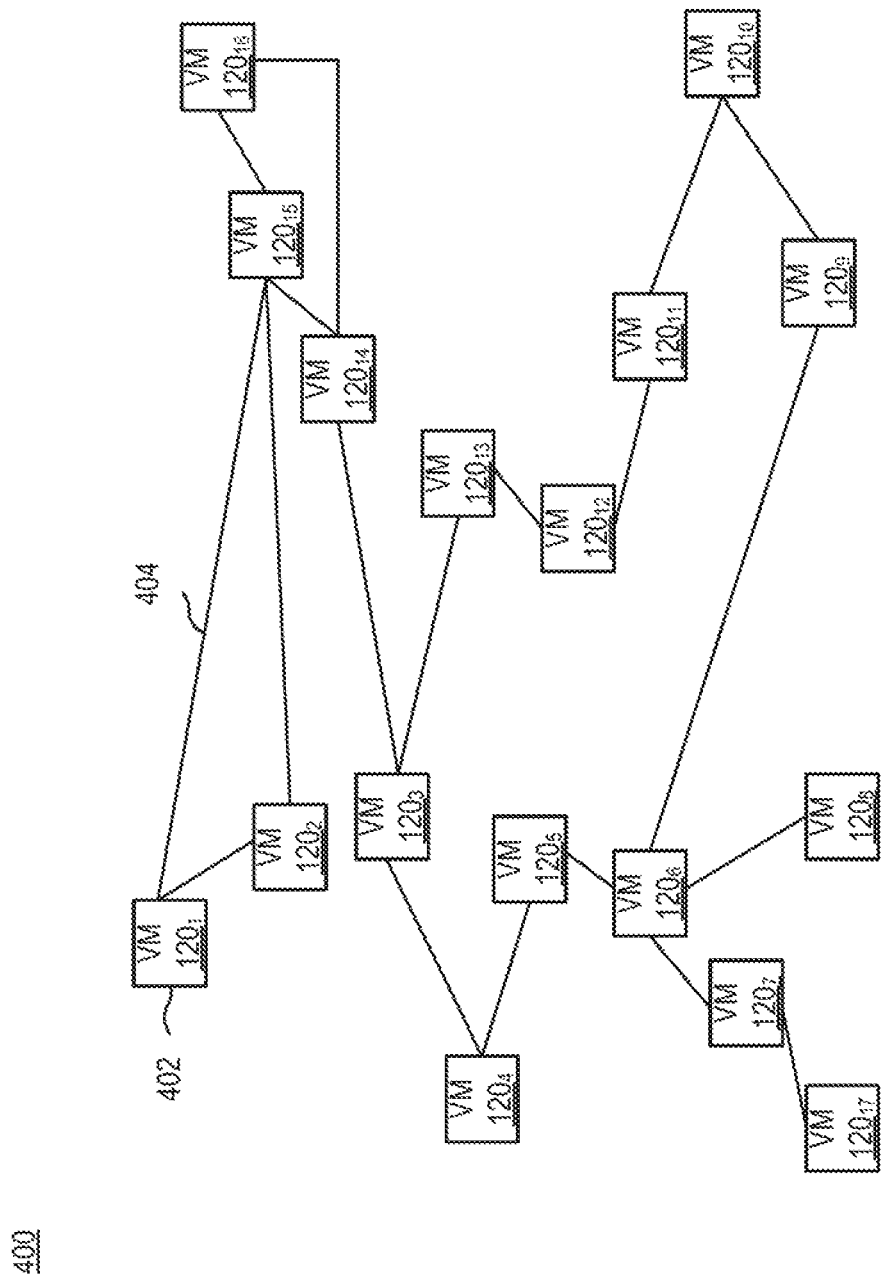
FIG. 4A illustrates an example graph denoting virtual machines within the scope of migration, according to an embodiment

For example, FIG. 4A illustrates an example graph 400 denoting VMs within the scope of migration as well as their respective network connectivity. In this example, hybrid cloud manager 132 determined that seventeen VMs $120_1$-$120_{17}$ are within the scope of migration. Each VM $120_i$ is represented as a unique node 402 in graph 400. Graph 400 illustrates a plurality of edges 404 connecting a single node $402_i$ to one or more nodes $402_j$, where i, j∈(1 ... 17). Each edge 404 denotes a network connection between a given set of nodes. Accordingly, graph 400 illustrates the VMs 120 within the defined scope and their associated network connections.

At step 304, hybrid cloud manager 132 groups VMs defined in the scope of migration into one or more clusters. Grouping the VMs into one or more clusters aids in migrating related VMs at the same time. For example, assume that in a disaster recovery scenario that there is a three-tier application to be migrated. Assume VM $120_x$ hosts a web server; VM $120_y$ hosts and application; and VM $120_z$ hosts a database, where x,y,z∈(1 ... n). The user would create a recovery plan where the user would explicitly create different sets (i.e. three in this case: web server, application, and database) and instruct hybrid cloud manager 132 to first recover/boot all VMs that belong to database, and then the application, and then the web server. Accordingly, VM $120_x$, VM $120_y$, and VM $120_z$ would be grouped in the same cluster.

Figure 5:
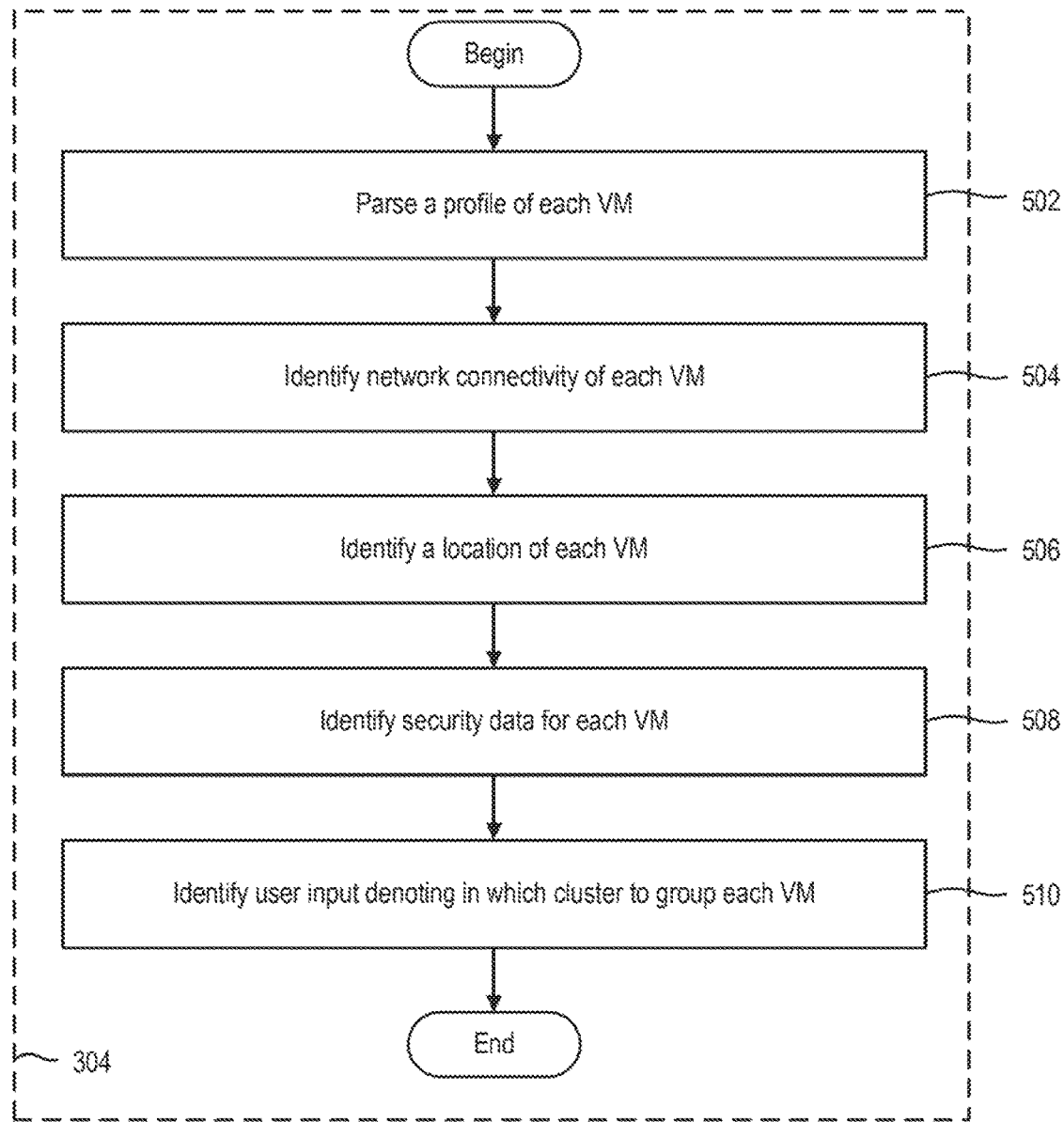
FIG. 5 is a flow diagram illustrates in more detail a sub-step from the method of FIG. 3, according to an embodiment.

FIG. 5 is a flow diagram 500 of step 304 from FIG. 3 in more detail, according to an embodiment. Step 304 includes sub-steps 502-510. At sub-step 502, hybrid cloud manager 132 searches through a profile of each VM to determine how to group each respective VM. Hybrid cloud manager 132 may parse through a VM profile searching for application signatures, type of operating system, and the like to determine how to group that respective VM. For example, hybrid cloud manager 132 may try to group each VM executing a Windows operating system. In another example, hybrid cloud manager 132 may identify an Oracle database application signature in one VM profile, and subsequently attempt the group all VMs with the Oracle database application signature.

At step 504, hybrid cloud manager 132 identifies network connectivity of each VM. Determining which additional VMs a respective VM communicates with aids in determining how to group the respective VM. For example, it would be beneficial for VMs that communicate often (i.e., "chatty" VMs) to be grouped together, or categorized as closely as possible.

At step 506, hybrid cloud manager 132 identifies a location of each VM. Determining the location of each VM aids in determining how to group the respective VM. For example, VMs located as peers within a given network provides an indication that those VMs have some form of dependency. As such, it would be beneficial to group those VMs together in a cluster. Graph 400 in FIG. 4A denoting the network connectivity between each VM is helpful in determining how to group each VM. For example, hybrid cloud manager 132 may group each VM having a direct connection therebetween (i.e., and edge connecting two nodes) into a respective cluster.

At step 508, hybrid cloud manager 132 identifies security data for a respective VM. For example, network security and flow rules may be defined with application groups in mind. The network security and flow rules may be in the form of firewall rules. Parsing network security data for each VM can aid in identifying groups of VMs, which can be grouped together in a cluster. It is beneficial to group such VMs, because constraining the group of VMs to a single cluster can decrease an amount of security barriers that must be overcome.

At step 510, hybrid cloud manager 132 is configured to receive user input related to grouping VMs. For example, hybrid cloud manager 132 may work with a third-party plugin that allows a user to define clusters of VMs. In an embodiment, user may only predefine one or more clusters of VMs. In this scenario, hybrid cloud manager 132 may carry out steps 302-310 above to determine additional clusters of VMs. In another embodiment, the user may predefine all clusters of VMs, such that there are no remaining VMs for hybrid cloud manager 132 to categorize.

Figure 4B:
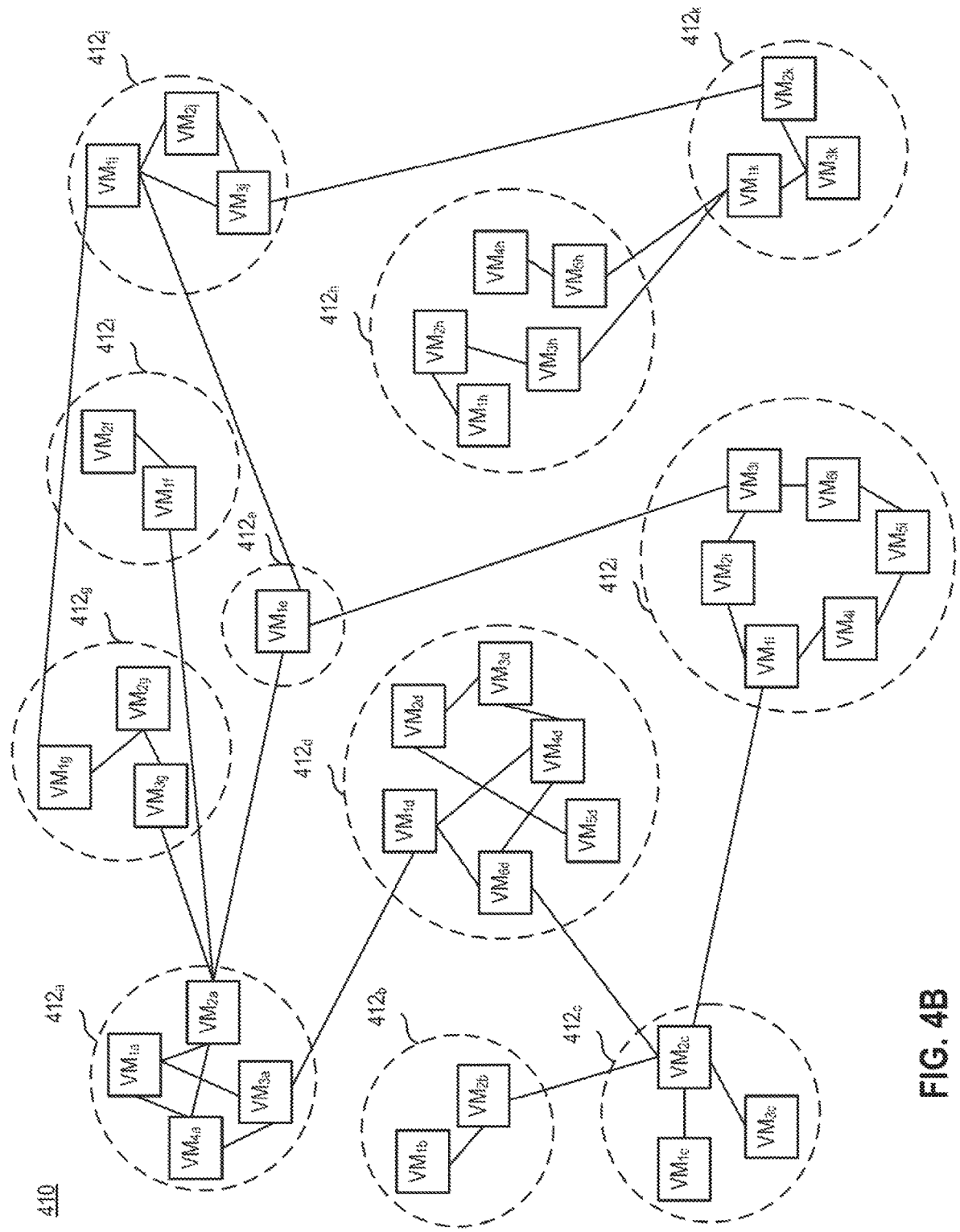
FIG. 4B is a graph illustrating a set of virtual machines categorized into one or more cluster, according to an embodiment.

FIG. 4B illustrates a graph 410 illustrating a set of VMs $120_{1a}$-$120_{3k}$ categorized into one or more clusters 412a-$412_k$. As shown, cluster $412_a$ is a cluster comprising $VM_{1a}$, $VM_{2a}$, $VM_{3a}$, and $VM_{4a}$. Cluster $412_a$ may be directed to VMs across which an Oracle database is executing. For example, cluster $412_b$ may be a cluster comprising $VM_{1b}$ and $VM_{2b}$. Cluster $412_b$ is directed to VMs across which a web server is executing. Cluster $412_c$ is a cluster comprising $VM_{1c}$, $VM_{2c}$, and $VM_{3c}$. Cluster $412_c$ may be directed to VMs across which a Windows server farm is executing. Cluster $412_d$ is a cluster comprising $VM_{1d}$, $VM_{2d}$, $VM_{3d}$, $VM_{4d}$, $VM_{5d}$, and $VM_{6d}$. Cluster $412_d$ may be directed to VMs across which big data is stored. Cluster $412_e$ is a cluster comprising $VM_{1e}$. Cluster $412_e$ may be directed to VMs across which a test server is executing. Cluster $412_f$ is a cluster comprising $VM_{1f}$ and $VM_{2f}$. Cluster $412_f$ may be directed to VMs across which an active directory is executing. Cluster $412_g$ is a cluster comprising $VM_{1g}$, $VM_{2g}$, and $VM_{3g}$. Cluster $412_g$ may be directed to VMs across which a MySQL® database may be executing. As discussed, hybrid cloud manager 132 defined clusters $412_a$-$412_g$ by parsing each VM and locating an application signature defined therein. In other words, clusters $412_a$-$412_g$ are application based clusters.

Cluster $412_h$ is a cluster comprising $VM_{1h}$, $VM_{2h}$, $VM_{3h}$, $VM_{4h}$, and $VM_{5h}$. Cluster $412_i$ is a cluster comprising $VM_{1i}$, $VM_{2i}$, $VM_{3i}$, $VM_{4i}$, $VM_{5i}$, and $VM_{6i}$. Cluster $412_j$ is a cluster comprising $VM_{1j}$, $VM_{2j}$, and $VM_{3j}$. In an embodiment, cluster $412_h$-$412_1$ may be clusters that were defined based on network connectivity. In another embodiment, cluster $412_h$-$412_1$ may be clusters that were defined based on network security rules. In another embodiment, each cluster $412_h$-$412_1$ is defined based on discovery methods discussed above in conjunction with FIG. 5.

Cluster $412_k$ is a cluster comprising $VM_{1k}$, $VM_{2k}$, and $VM_{3k}$. In an embodiment, cluster $412_k$ is a user-defined cluster. For example, hybrid cloud manager 132 may receive feedback from the user noting that $VM_{1k}$, $VM_{2k}$, and $VM_{3k}$ should be grouped together as a cluster. In an embodiment, such grouping may eliminate the $VM_{1k}$, $VM_{2k}$, and $VM_{3k}$ from the pool of VMs to be analyzed by hybrid cloud manager Referring back to FIG. 3, at step 306, hybrid cloud manager 132 defines one or more migration phases. For example, hybrid cloud manager 132 categorizes each cluster into a specific migration phase. Hybrid cloud manager 132 derives an initial strategy for each VM from private data center 102 to cloud data center 150. Hybrid cloud manager 132 derives this strategy through several factors such as business criticality of the cluster, as well as the cluster's dependency to other VMs or additional clusters. For example, referring to FIG. 4B, cluster $412_a$ includes $VM_{2a}$, which communicates with $VM_{3g}$ in cluster $412_g$, $VM_{1f}$ in cluster $412_f$, and $VM_{1e}$ in cluster $412_e$, as well as $VM_{3a}$ which communicates with $VM_{1d}$ in cluster $412_d$. As such, hybrid cloud manager 132 may determine that cluster $412_a$ is one of the more critical clusters because cluster $412_a$ has the most lines of communication extending therefrom. Accordingly, cluster $412_a$ may be included in a first migration phase due to its criticality. In another embodiment, hybrid cloud manager 132 may derive the migration strategy based on the progression of infrastructure replication from private data center 102 to cloud data center 150. For example, the migration phases may be defined based on the estimated time it will take for portions of the infrastructure on private data center 102 to be replicated on private data center 150.

Figures 4C, 4D:
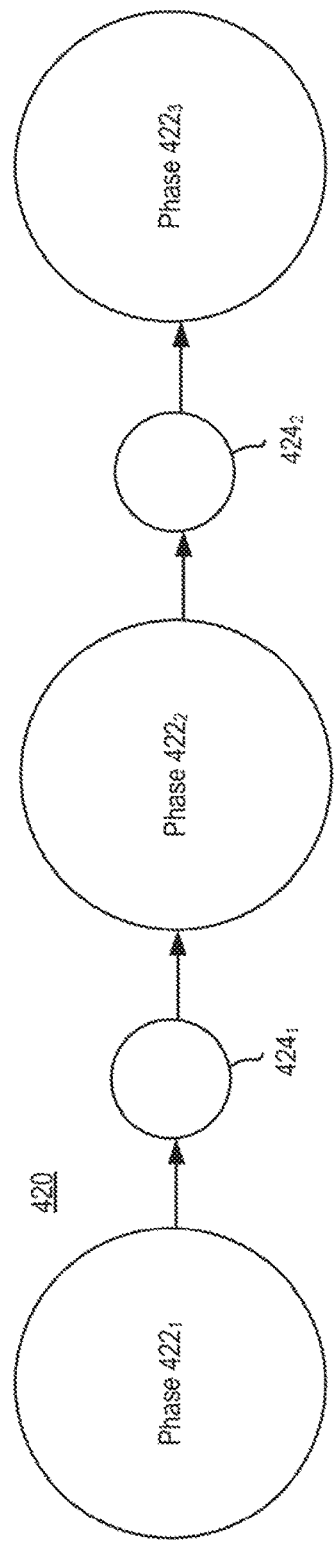
FIG. 4C is a flow diagram visually illustrating a migration strategy, according to an embodiment.
FIG. 4D illustrates an example of a chart generated by hybrid cloud manager, according to an embodiment.

FIG. 4C illustrates a flow diagram visually illustrating a migration strategy 420, according to one embodiment. Migration strategy 420 includes migration phase $422_1$, migration phase $422_2$, and migration phase $422_3$. Each migration phase $422_1$-$422_3$ encompasses one or more clusters $412_a$-$412_k$ defined above, in conjunction with FIG. 4B. For example, hybrid cloud manager 132 may begin migration with those VMs grouped in the clusters associated with migration phase $422_1$. In an embodiment, after migration phase 422₁, hybrid cloud manager 132 reaches a first validation point 424₁. At first validation point 424₁, hybrid cloud manager 132 prompts the user to validate, or ask for changes, to the remaining migration strategy set forth in migration phases 422₂ and 422₃. For example, a user may edit migration phases 422₂ and 422₃ to swap one or more clusters therebetween. Additionally, at first validation point 424₁, user may bifurcate the remaining migration phases to prioritize one or more clusters. Continuing with the example in FIG. 4C, after validation point 424₁ and migration phase 422₂, hybrid cloud manager reaches a second validation point 424₂. Generally, for each migration phase, there may exist a validation point prior to the migration phase for user validation. At each validation point, a user may edit the remaining migration phases.

As the hybrid cloud manager 132 defines the migration phases, hybrid cloud manager 132 may also generate a chart listing the VMs defined in the migration scope, the cluster to which each VM belongs, the migration phase of that VM, and as the VM's associated hybridity actions. FIG. 4D illustrates an example of a chart 490 generated by cloud manager 132. Hybridity actions may include preferences related to network extensions, network rules (firewall rules, routes, and the like), memory, boot order, and the like. For example, as illustrated in chart 400, VM₁ is associated with Group₁, which will be migrated in Phase₁; VM₂ is associated with Group₁, which will be migrated in Phase₁; VM₃ is associated with Group₂, which will be migrated in Phase₁; VM₄ is associated with Group₆, which will be migrated in Phase₃.

At step 308, hybrid cloud manager 132 generates a migration schedule. Hybrid cloud manager 132 generates the migration schedule based off at least the one or more migration phases defined at step 310. For example, migration schedule may be based off of first migrating phase 422₁, then migration phase 422₂, and subsequently migration phase 422₃. Additionally, hybrid cloud manager 132 may generate the migration schedule based off user input, as well as the one or more migration phases in step 310. For example, hybrid cloud manager may generate an initial migration schedule, and then modify the migration schedule after input from the user.

FIG. 4E illustrates an example of a migration schedule 440, generated according to step 308 discussed above in conjunction with FIG. 3. Migration schedule 440 is broken down into tables 441₁-441₃ associated with each migration phase. Table 441₁ illustrates the clusters associated with migration phase 422₁. Table 441₂ illustrates the clusters associated with migration phase 422₂. Table 441₃ illustrates the groups associated with migration phase 422₃. For each group, tables 441₁-441₃ list the estimated time of migration, transfer size estimate, and retry policy, alert level, and migration type. The estimated time of migration defines an estimated time it will take to migrate the VMs in a given cluster from private data center 102 to cloud data center 150. The estimated transfer size defines an estimated size of each cluster. The retry policy defines an amount of attempts that will be made to migrate each cluster to cloud data center 150 before prompting the user with an error message. The migration type defines the type of migration for each cluster. For example, the migration type may be chosen from one of a cold, warm, or hot migration. In a cold migration, hybrid cloud manager 132 suspends the VM on private data center 102 before transferring the VM to cloud data center 150 and subsequently powering back on the VM. In a warm migration, the hybrid cloud manager 132 creates a replica of a live VM (i.e., the source VM) and moves the replica to the cloud data center 150. The hybrid cloud manager 132 subsequently performs a switchover to power off the source VM and power on the migrated replicated VM. In a hot migration, the VM is not suspended prior to migration from private data center 102 to cloud data center 150; rather, the VM is "live," i.e. remains powered-on.

Referring back to FIG. 3, at step 310 hybrid cloud manager 132 begins migration of the VMs from private data center 102 to cloud data center 150. Hybrid cloud manager 132 migrates the VMs in accordance with schedule 440 generated in step 308. In some embodiments, hybrid cloud manager 132 may pause migration at one or more validation points after each migration phase to determine whether the user has any changes to the migration schedule. Based on whether the user modifies the migration schedule, hybrid cloud manager 132 may update the schedule 440 and continue with migration.

Accordingly, the method discussed in FIG. 3 eliminates the need for manual entry of a recovery or migration plan from private data center 102 to cloud data center 150.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating virtual machines (VMs) from a private data center to a cloud data center, comprising:
    determining a scope of migration from the private data center to the cloud data center;
    grouping each VM included in the scope of migration into one or more clusters;
    defining one or more migration phases, wherein each migration phase comprises a subset of the one or more clusters;
    generating a migration schedule based on at least the one or more migration phases; and
    migrating the VMs from the private data center to the cloud data center in accordance with the migration schedule.

2. The method of claim 1, wherein determining the scope of migration from the private data center to the cloud data center, comprises:
    identifying those VMs marked as protected for disaster recovery scenarios.

3. The method of claim 1, wherein determining the scope of migration from the private data center to the cloud data center, comprises:
    identifying those VMs selected by a user for selective migration.

4. The method of claim 1, wherein grouping each VM included in the scope of migration into one or more clusters, comprises:
    parsing a profile of each VM searching for an application signature associated with the VM.

5. The method of claim 1, wherein grouping each VM included in the scope of migration into one or more clusters, comprises:
    identifying network connectivity of each VM.

6. The method of claim 1, wherein grouping each VM included in the scope of migration into one or more clusters, comprises:
    identifying a location of each VM.

7. The method of claim 1, wherein grouping each VM included in the scope of migration into one or more clusters, comprises:
    identifying security data for each VM.

8. The method of claim 1, wherein grouping each VM included in the scope of migration into one or more clusters, comprises:
    identifying user input denoting in which cluster to group each VM.

9. A non-transitory computer readable medium having instructions stored thereon that when executed by a processor cause the processor to perform a method of migrating virtual machines (VMs) from a private data center to a cloud data center, comprising:
    determining a scope of migration from the private data center to the cloud data center;
    grouping each VM included in the scope of migration into one or more clusters;
    defining one or more migration phases, wherein each migration phase comprises a subset of the one or more clusters;

generating a migration schedule based on at least the one or more migration phases; and migrating the VMs from the private data center to the cloud data center in accordance with the migration schedule.

10. The non-transitory computer readable medium of claim 9, wherein determining the scope of migration from the private data center to the cloud data center, comprises:

identifying those VMs marked as protected for disaster recovery scenarios.

11. The non-transitory computer readable medium of claim 9, wherein determining the scope of migration from the private data center to the cloud data center, comprises:

identifying those VMs selected by a user for selective migration.

12. The non-transitory computer readable medium of claim 9, wherein grouping each VM included in the scope of migration into one or more clusters, comprises:

parsing a profile of each VM searching for an application signature associated with the VM.

13. The non-transitory computer readable medium of claim 9, wherein grouping each VM included in the scope of migration into one or more clusters, comprises:

identifying network connectivity of each VM.

14. The non-transitory computer readable medium of claim 9, wherein grouping each VM included in the scope of migration into one or more clusters, comprises:

identifying a location of each VM.

15. The non-transitory computer readable medium of claim 9, wherein grouping each VM included in the scope of migration into one or more clusters, comprises:

identifying security data for each VM.

16. The non-transitory computer readable medium of claim 9, wherein grouping each VM included in the scope of migration into one or more clusters, comprises:

identifying user input denoting in which cluster to group each VM.

17. A computer system, comprising:

a processor; and a memory storing program code, which, when executed on the processor, performs a method of migrating virtual machines (VMs) from a private data center to a cloud data center, comprising:

determining a scope of migration from the private data center to the cloud data center;

grouping each VM included in the scope of migration into one or more clusters;

defining one or more migration phases, wherein each migration phase comprises a subset of the one or more clusters;

generating a migration schedule based on at least the one or more migration phases; and migrating the VMs from the private data center to the cloud data center in accordance with the migration schedule.

18. The computer system of claim 17, wherein determining the scope of migration from the private data center to the cloud data center, comprises:

identifying those VMs marked as protected for disaster recovery scenarios.

19. The computer system of claim 17, wherein determining the scope of migration from the private data center to the cloud data center, comprises:

identifying those VMs selected by a user for selective migration.

20. The computer system of claim 17, wherein grouping each VM included in the scope of migration into one or more clusters, comprises:

parsing a profile of each VM searching for an application signature associated with the VM.

* * * * *